(12) United States Patent
Johnson et al.

(10) Patent No.: US 7,412,459 B1
(45) Date of Patent: Aug. 12, 2008

(54) DYNAMIC MOBILE CD MUSIC ATTRIBUTES DATABASE

(75) Inventors: Bruce Alan Johnson, Woodinville, WA (US); William A. Spencer, Redmond, WA (US); Anton Phillip Sohn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 10/400,044

(22) Filed: Mar. 25, 2003

(51) Int. Cl.
*G06F 17/30* (2006.01)

(52) U.S. Cl. .................. 707/104.1; 700/74; 700/94; 369/30

(58) Field of Classification Search ............... 396/47.1; 369/30.05, 30.2, 30.3, 30.06; 711/114, 162; 84/609; 709/238; 700/94; 707/104.1; 382/190
See application file for complete search history.

(56) References Cited

U.S. PATENT DOCUMENTS

| | | | | |
|---|---|---|---|---|
| 5,751,672 A | * | 5/1998 | Yankowski | ................. 709/238 |
| 5,809,543 A | * | 9/1998 | Byers et al. | ................. 711/162 |
| 6,067,279 A | * | 5/2000 | Fleming, III | ............. 369/30.06 |
| 6,157,597 A | * | 12/2000 | Fleming, III | ............... 369/30.3 |
| 6,233,654 B1 | * | 5/2001 | Aoki et al. | ................... 711/114 |
| 6,347,065 B1 | * | 2/2002 | Fleming, III | ............... 369/30.2 |
| 6,449,226 B1 | * | 9/2002 | Kumagai | .................. 369/47.1 |
| 6,512,722 B2 | * | 1/2003 | Kumagai | ................. 369/30.05 |
| 6,600,097 B2 | * | 7/2003 | Shiiya | ......................... 84/609 |
| 6,915,176 B2 | * | 7/2005 | Novelli et al. | ................. 700/94 |
| 2004/0131255 A1 | * | 7/2004 | Ben-Yaacov et al. | ........ 382/190 |
| 2005/0125087 A1 | * | 6/2005 | Ben-Yaacov et al. | .......... 700/94 |

* cited by examiner

*Primary Examiner*—Shahid A Alam
(74) *Attorney, Agent, or Firm*—Lee & Hayes, PLLC

(57) ABSTRACT

Handheld CD (compact disc) players are described. In one instance, a handheld CD player includes a CD drive to receive a CD and to determine a CD identification from the CD and a media slot to receive a portable memory card having a database. The handheld CD player also includes an attributes access module configured to retrieve music attributes from the database associated with the CD identification and to store the CD identification in the database if the CD identification is not already in the database.

10 Claims, 4 Drawing Sheets

DYNAMIC MOBILE CD MUSIC ATTRIBUTES DATABASE

TECHNICAL FIELD

The present disclosure generally relates to CD players, and more particularly, to a database of CD music attributes that can be updated and transferred between CD-capable devices.

BACKGROUND

Personal computers (PCs) typically include a software media player that permits a user to play back various forms of multimedia file formats such as, for example, DVD (Digital Versatile Disc), CDDA (Compact Disc-Digital Audio), MPEG (Motion Pictures (Coding) Experts Group) video, MP3 (MPEG-1/2 Audio Layer III), WMA (Windows® Media Audio 8), WAV (Windows® Wave), WMV (Windows® Media Video) and the like. Examples of such software media players include RealNetwork's Real One player, Apple Computer's QuickTime and Microsoft's Windows Media Player.

In addition to playing back different media formats on a PC, media players often perform other functions including, for example, copying CD tracks onto the PC hard disc in various file formats (e.g., WAV, WMA, MP3) and organizing the files into a desired playback order, copying music to a portable device, burning an audio or data CD, and retrieving and displaying various media information or attributes about the music that a user plays on the PC. Music attributes can include information such as, for example, CD titles, album art, composers, artists, biographies, discographies, musical genre, album recording date, reviews, related news, related artists, track titles, and the like.

Music attribute information for many CDs is available online through various Internet database services. Thus, media players executing on PC's or other computers that have Internet access can readily obtain music attributes for a wide range of CD music. For example, when a media player plays a CD or rips a CD track and encodes it as a WMA or MP3 file, the media player might also access an Internet database service and download music attributes for the entire CD or the ripped CD track. Music attributes for ripped CD tracks can be encoded into WMA and MP3 files as metadata tags. Therefore, the music attributes travel with the encoded files and are available for display on a PC and various other remote devices to which the files can be transferred.

Media players on PCs can also store the music attributes retrieved from an Internet database service in a media library/database on the PC. In general, music attributes stored on an Internet database or in a media library/database on a PC are identifiable or associated with a particular CD through a CD identifier called a table of contents (TOC). The TOC is not stored on the CD, but is instead a calculation of start and stop times for the music tracks on the CD. The start and stop times for music tracks on a CD are measured to within $1/77^{th}$ of a second when a CD is inserted into a CD player. Thus, virtually all CDs are uniquely identifiable by their TOC. The TOC identifier can be used to associate music attributes for a CD in various environments, such as an Internet database or a PC media library/database. Thus, a media player on a PC can maintain a media library that includes music attributes for various CDs associated by CD TOCs. When a CD is played on the PC, the media player can display music attributes from the media library that are associated through the CD TOC. If the CD TOC is not available in the media library, the media player can access an Internet database service and make a request to have the music attributes downloaded based on the CD TOC.

Various remote and/or portable CD-capable devices (e.g., car stereos, hand-held portable CD players) can play conventional CD, CD-R (CD recordable), and CD-RW (CD rewritable) discs, as well as MP3 and WMA-encoded music files stored on CD-R/RWs or other storage media such as SD cards, compact flash cards, and PCMCIA flash cards. Such remote CD-capable devices are also generally able to display music attributes stored as metadata tags in MP3 and WMA-encoded music files. Therefore music attributes are available for display on remote CD devices if CD tracks have been ripped to MP3 or WMA files. However, music attributes are not available for display on remote CD devices if CD tracks are played directly from a CD. This is because music attributes are not stored on the CDs themselves and because remote CD-capable devices do not maintain updated media libraries containing CD TOCs and associated music attributes.

Accordingly, a need exists for a way to provide music attributes for CD tracks when CDs are played on remote CD-capable devices.

SUMMARY

A database can be updated on a PC and transferred to remote CD (compact disc) players so that music attributes for CDs are displayable on remote players while CDs are played.

In one embodiment, a PC receives a portable memory card and determines if a new CD identification is present on the card. The PC downloads music attributes from a network server for new CD identifications found on the card. The PC stores the attributes in a CD database and synchronizes the database to the portable memory card.

In another embodiment, a remote CD player receives a CD and checks a portable memory card for a CD identification. If the CD identification is found on the card, the player accesses music attributes on the card associated with the CD and displays the attributes while playing the CD. If the CD identification is not found on the card, the player stores the identification on the card as a new CD identification.

BRIEF DESCRIPTION OF THE DRAWINGS

The same reference numerals are used throughout the drawings to reference like components and features.

DETAILED DESCRIPTION

Overview

The following discussion is directed to a dynamic mobile database of CD (compact disc) music attributes and the automatic updating of such a database as it travels between a PC (personal computer) and various remote CD players on a portable storage medium. When playing a CD, a remote player searches for a CD identifier in the mobile database and displays associated music attributes from the database if the CD identifier is present. CD identifiers not found in the database are added to the database on the portable storage medium by the remote player. When the portable storage medium is transferred to a PC, the PC accesses an online music information service and downloads music attributes for the new CD identifier that has been added to the database. The PC then updates the database with the new music attributes.

The PC can also update the database anytime it encounters a new CD. Thus, music attributes for any CDs that are played by the PC, burned by the PC, or ripped by the PC are also added to the mobile database. Advantages of the mobile CD music attributes database include the ability to display useful media information for CD music played on remote CD players.

Exemplary Environment

Figure 1:
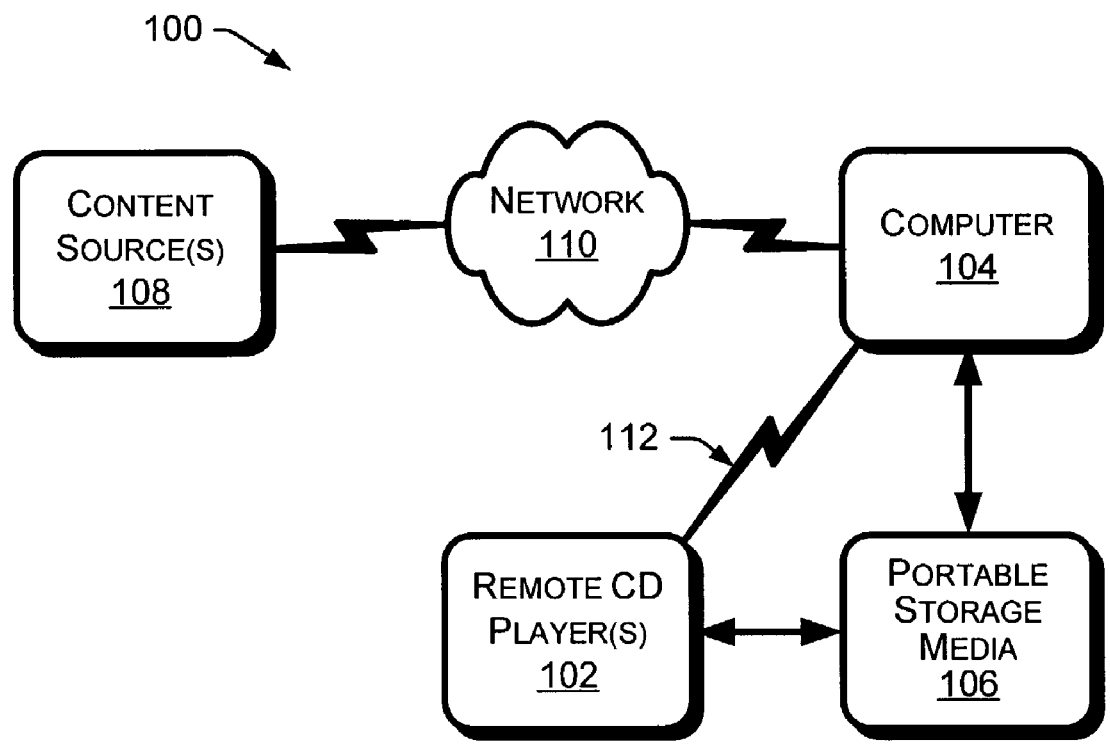
FIG. 1 illustrates an exemplary environment for implementing one or more embodiments of a dynamic mobile CD music attributes database.

FIG. 1 shows an exemplary environment 100 suitable for implementing one or more embodiments of a dynamic mobile CD music attributes database. The exemplary environment can include remote CD players 102 of various types, a computer 104, portable storage media 106 for the remote CD players 102 and computer 104, and one or more content sources 108. Computer 104 is operatively coupled to content source(s) 108 through a network 110. Network 110 can include both local and remote connections depending on the particular system configuration. Thus, network 110 may include, for example, any one or a combination of a modem, a cable modem, a LAN (local area network), a WAN (wide area network), an intranet, the Internet, or any other suitable communication link.

Portable storage media 106 can be any of a number of portable nonvolatile memory devices useful for conveying information between computer 104 and a remote CD player 102 including, for example, an SD (secure digital) card, a CF (compact flash) card, a SmartMedia card, a Memory Stick, a MMC (multimedia card), a PCMCIA (Personal Computer Memory Card International Association) flash card, a portable hard disc drive (e.g., a USB, Firewire, or PCMCIA interface device) and the like. In certain instances, portable storage media 106 might also be a burnable CD such as a CD-R (CD-recordable disc) or CD-RW (CD-rewritable disc).

Communication link 112 between computer 104 and remote CD player 102 is a wireless (radio) link such as Bluetooth, GPRS (General Packet Radio Services), Wi-Fi or any of the IEEE (Institute of Electrical and Electronics Engineers) 802.11 family of standard specifications (e.g., 802.11, 802.11a, 802.11b, and 802.11g) for wireless local area networks (WLANs). In general, wireless link 112 may be used in conjunction with or instead of portable storage media 106 to convey information between computer 104 and a remote CD player 102.

Remote CD player 102 can be implemented as any of a variety of portable or mobile CD-capable devices including handheld devices, automobile devices, and so on. Examples of such devices include Sony's D-CJ500 CD/MP3 Player, SONICblue's RioVolt SP50C CD/MP3 Player, Alpine's CDA-9815 CD/MP3% WMA car stereo receiver, and Sony's CDX-MP70 CD/MP3 car stereo receiver. Such devices typically have the capability of playing both standard audio CDs as well as CD-Rs and CD-RWs. In addition, many conventional CD-capable devices have the capability of playing music in compressed formats including, for example, MP3 (MPEG-1/2 Audio Layer III) and WMA (Windows® Media Audio 8) file formats. Furthermore, devices that are MP3 compatible are typically able to display ID3 tags from MP3 files while playing the MP3 files. ID3 tags are MP3 file markers that include information about a song, such as the title, the artists, the album name, and so on. Therefore, while playing MP3 formatted music, a CD-capable device might also be able to display certain attributes about the music. However, conventional remote or portable CD-capable devices are not able to display such additional information when playing standard audio CDs, because such information is not presently conveyed on standard audio CDs. Accordingly, a discussion of the exemplary embodiments in the following section includes a description of a dynamic mobile CD music attributes database that enables a remote CD player 102 to display such additional music attribute information while playing standard audio CDs.

Content source 108 is typically implemented as one or more server computers such as a Web server. Thus, content source 108 may include a variety of general purpose computing devices such as a workstation computer, and may be configured in a manner similar to an exemplary implementation of computer 104 as described below with reference to FIG. 4. Content source 108 generally provides storage for electronic documents and information including various multi-media content that is accessible to client computers such as computer 104 over network 110. More specifically, content source 108 offers an online database service that provides music information to a computer 104 for a wide variety of CD music. The information available on a content source 108 can include CD music attributes such as CD titles, album art, composers, artists, biographies, discographies, musical genre, recording dates, reviews, related news, related artists, track titles, and the like. Examples of content sources 108 include Gracenote.com and WindowsMedia.com.

Computer 104 generally retrieves CD music attributes from a content source 108 for playback on computer 104 or on a remote CD player 102 after the content is transferred via portable storage media 106 or wireless link 112. Computer 104 is a CD-capable device and includes a media player for CDs and other media and a corresponding database of CD music attributes. The media player on computer 104 typically updates the CD attributes database with new CD information retrieved from a content source 108 whenever computer 104 plays a new CD, burns a custom CD, rips tracks from a new CD, or otherwise encounters a new CD. Computer 104 is otherwise typically capable of performing common computing functions, such as email, calendaring, task organization, word processing, Web browsing, and so on. In this embodiment, computer 104 runs an open platform operating system, such as the Windows® brand operating systems from Microsoft®. Computer 104 may be implemented, for example, as a desktop computer, a server computer, a laptop computer, or other form of personal computer (PC). One exemplary implementation of computer 104 is described in more detail below with reference to FIG. 4.

Exemplary Embodiments

Figure 2:
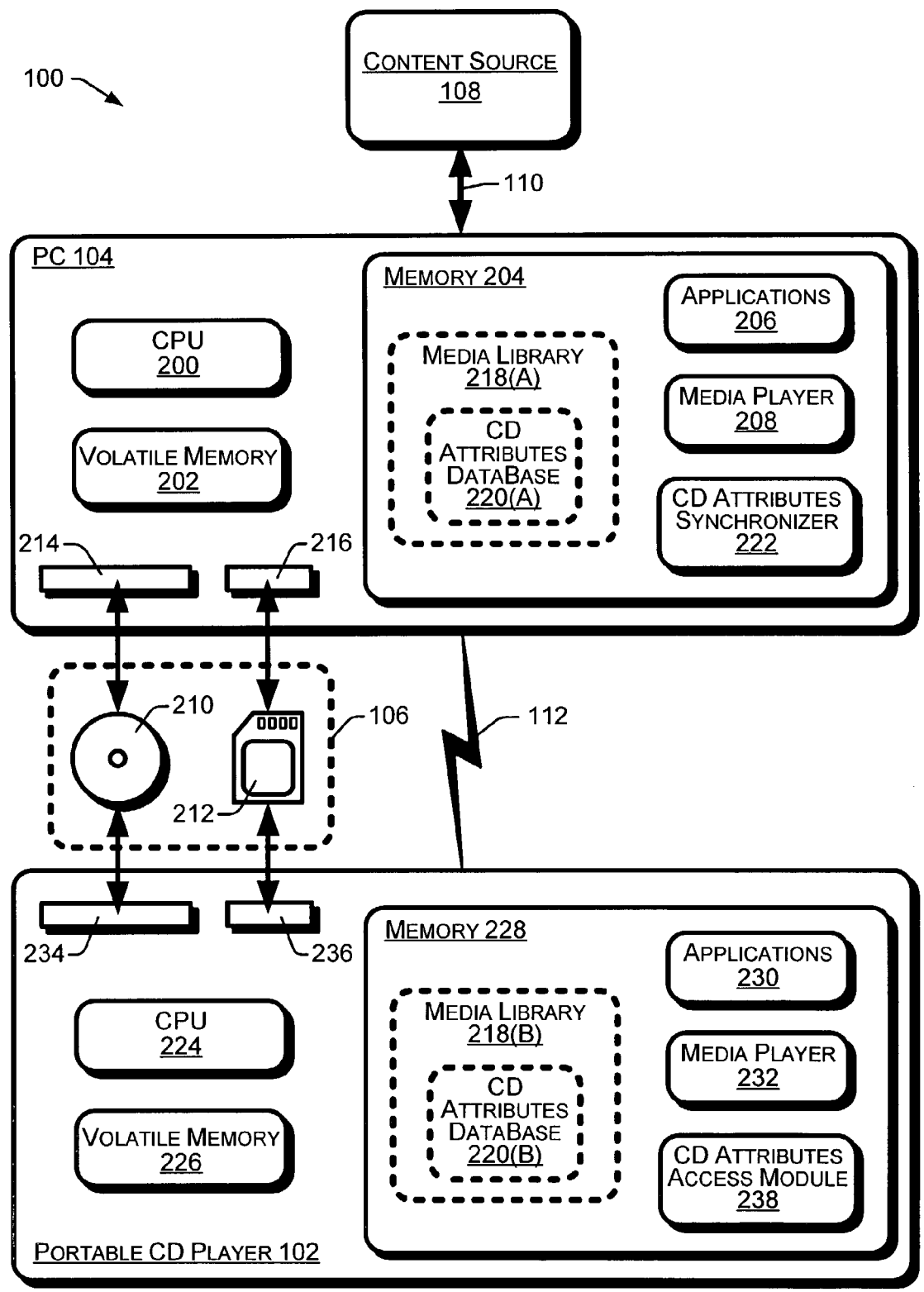
FIG. 2 is a block diagram of an exemplary hardware/software architecture of a personal computer and remote CD player as might be implemented in the environment of FIG. 1.

FIG. 2 is a block diagram representation of an exemplary embodiment of a remote CD player 102 and computer 104 as might be implemented in the environment 100 of FIG. 1. Computer 104 is implemented as a PC (personal computer) such as a desktop or laptop PC. Remote CD player 102 is implemented as a portable CD player 102.

PC 104 includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for PC 104. One exemplary implementation of a PC 104 is described in more detail below with reference to FIG. 4. PC 104 typically implements various application programs 206 stored in memory 204 and executed on processor 200. Such applications 206 might include software programs implementing, for example, word processors, spread sheets, browsers, multimedia players, illustrators, computer-aided design tools and the like. In the FIG. 2 embodiment, media player 208 is separately illustrated as one such application.

Media player 208 is a software component generally tailored for playing back different forms of multimedia file formats. Examples of a media player 208 might include software media players such as RealNetwork's Real One player, Apple Computer's QuickTime and Microsoft's Windows Media Player. Media player 208 can typically play back multimedia file formats such as DVD (Digital Versatile Disc), CDDA (Compact Disc-Digital Audio), MPEG (Motion Pictures (Coding) Experts Group) video, MP3 (MPEG-1/2 Audio Layer III), WMA (Windows® Media Audio 8), WAV (Windows® Wave), WMV (Windows® Media Video), and the like.

Media player 208 also serves as a ripper, an encoder, and a CD burner. As a ripper, media player 208 takes digital audio information from a CD and creates a WAV file. Media player 208 then encodes or compresses the WAV file as an MP3 or WMA file. Music in various file formats can be transferred between PC 104 and portable player devices (e.g., remote CD player 102) through a portable storage medium 106, such as a CD 210 or memory card 212, or a wireless connection 112 as discussed below. Thus, PC 104 includes CD drive 214 for receiving CDs and media slot 216 for receiving memory devices such as a memory card 212. In addition to copying music and other media information onto portable media 106 such as a memory card 212 through media slot 216, media player 208 also generally provides for burning audio and data CDs through CD drive 214.

Media player 208 maintains a media library 218(A) that includes a list of all the songs it plays in a CD music attributes database 220(A). This list also includes songs that the media player 208 rips and encodes and songs that it burns onto an audio CD through CD drive 214. In addition to maintaining an updated list of songs, media player 208 maintains the CD music attributes database 220(A) with media information associated with each song in its list. The CD media information in the database 220(A) can include music attributes for each CD in the list such as, for example, the CD title, album art, composers, artists, biographies, discographies, musical genre, album recording date, reviews, related news, related artists, track titles, and the like. Thus, whenever a CD 210 is played on PC 104, media player 208 identifies the CD 210 (i.e., through CD drive 214) and tries to find the CD identification in the CD music attributes database 220(A). If the CD is found in the database 220(A), the media player 208 retrieves music attributes associated with the CD and displays them. However, when a new CD 210 is encountered whose identification is not found in the database 220(A), media player 208 accesses a content source 108 and requests information for the new CD identification. Content source 108 downloads music attributes for the new CD to PC 104 and media player 208 stores the music attributes in the database 220(A).

In general, a CD 210 is identifiable by start and stop times for the CD music tracks located on the CD. When a CD is inserted into the CD drive 214, the drive 214 scans the CD with a laser and calculates the start and stop times for the tracks to determine the CD's identity. The CD identifier is often called the CD's table of contents (TOC). Because start and stop times for music tracks on a CD are measured to within $1/77^{th}$ of a second, virtually all CDs can be uniquely identified by their calculated TOC. Thus, it is a CD's TOC that the media player 208 uses to identify the CD both in the CD music attributes database 220(A) and on a content source 108.

The CD attributes synchronizer 222 is generally configured to synchronize the CD music attributes database 220(A) onto portable storage media 106 (e.g., a memory card 212, a CD 210), which enables transfer of the database 220(A) to portable CD player 102. Synchronizer 222 accesses a memory card 212 inserted into media slot 216, for example, to compare CD identifications on the memory card 212 with CD identifications in the CD music attributes database 220(A). Synchronizer 222 determines if a new CD identifier (i.e., a CD identifier not present in database 220(A)) has been stored on the memory card 212. If new CD identifiers are found to be on the memory card 212, synchronizer 222 calls media player 208 to update the database 220(A) with the new CD identifiers and associated music attributes for the new CDs. As discussed above, media player 208 accesses a content source 108 and requests information for the new CD identifiers. When content source 108 downloads music attributes for the newly identified CDs to the PC 104, media player 208 stores the music attributes in the database 220(A). CD attributes synchronizer 222 then synchronizes the CD music attributes database 220(A) onto the portable memory card 212 (i.e., portable storage medium 106) in media slot 216. Synchronizer 222 might also burn the database 220(A) onto a CD-R or CD-RW in CD drive 214.

In another embodiment, synchronizer 222 is configured to synchronize the CD music attributes database 220(A) directly with portable CD player 102 through a wireless connection 112. When a wireless link 112 is established between PC 104 and portable CD player 102, synchronizer 222 can establish whether CD identifications in the CD attributes database 220(A) are present in a corresponding CD attributes database 220(B) on portable CD player 102. Synchronizer 222 also determines through wireless link 112 if new CD identifiers (i.e., CD identifiers not present in database 220(A)) have been stored on the CD attributes database 220(B) on portable CD player 102. If new CD identifiers are found on the CD attributes database 220(B), synchronizer 222 calls on media player 208 to update the database 220(A) with the new CD identifiers and associated music attributes for the new CDs. As discussed above, media player 208 accesses a content source 108 and requests information for the new CD identifiers. When content source 108 downloads music attributes for the newly identified CDs to the PC 104, media player 208 stores the music attributes in the database 220(A). CD attributes synchronizer 222 then synchronizes the CD music attributes database 220(A) with the CD attributes database 220(B) on portable CD player 102 through wireless connection 112.

Remote CD player 102 is implemented as a portable CD player 102 in the FIG. 2 embodiment. Portable CD player 102 includes a processor 224, a volatile memory 226 (i.e., RAM), and a nonvolatile memory 228 (e.g., ROM, hard disk, floppy disk, CD-ROM, etc.). Nonvolatile memory 228 generally provides storage of computer/processor-readable instructions, data structures, program modules and other data for player 102. Player 102 typically implements various application programs 230 stored in memory 228 and executed on processor 224. One such application illustrated separately in the FIG. 2 embodiment, is a media player 232. Media player 232 is typically a scaled down version of a media player similar to the media player 208 described above on PC 104. For example, while media player 232 is typically configured to play back multimedia file formats such as standard audio CDs, MP3 files and WMA files, it may not include a capability to access an online server such as content source 108 as described above.

Depending on the size of memory 228 on portable CD player 102, media player 232 may or may not maintain a media library 218(B) and corresponding CD attributes database 220(B) stored in memory 228. Thus, a significant source of audio music data for media player 232 may be portable storage media 106 (i.e., CDs 210, portable memory cards 212) accessed via CD drive 234 and media slot 236. Media library 218(B) and CD attributes database 220(B) are the same as library 218(A) and database 220(A), respectively, except that they may be in a different states of being updated and they are either located in a memory on portable CD player 102, or they are located on a portable storage media 106 (i.e., CDs 210, portable memory cards 212) inserted into portable CD player 102.

CD attributes access module 238 is generally configured to access CD music attributes when portable CD player 102 plays a CD 210. Media player 232 can then display CD music attributes associated with the CD being played. Access module retrieves CD music attributes from a CD attributes database 220(B) located on portable storage media 106 (i.e., CDs 210, portable memory cards 212) in CD drive 234 or media slot 236. In another embodiment, access module 238 may first transfer CD attributes database 220(B) from portable storage media 106 to memory 228 and then retrieve CD music attributes from database 220(B) in memory 228. Access module 238 is further configured to update database 220(B) if a CD 210 is played by media player 232 whose CD identification is not present in the database 220(B).

Thus, when a CD 210 is played on portable CD player 102, CD player 102 calculates a CD TOC (i.e., CD identifier) using CD drive 234 in a manner similar to that discussed above for PC 104. Access module 238 searches database 220(B) for the CD identification and retrieves CD music attributes for the media player 232 to display on a display screen (not shown) if the CD identification is found in the database 220(B). However, if the CD identification is not found in the database 220(B), access module 238 stores the CD identification on the portable storage media 106 as a new CD identification. In this way, the database 220 will be updated with additional CD music attributes for any new CDs by PC 104 when new CD identifications are transferred to the PC 104 via portable storage media 106. It is noted that access module 238 might also transfer new CD identifications to a PC 104 via wireless link 112.

Exemplary Methods

Example methods for implementing one or more embodiments of a dynamic mobile CD music attributes database 220 will now be described with primary reference to the flow diagram of FIG. 3. The methods apply generally to the exemplary embodiments discussed above with respect to FIG. 2. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 3:
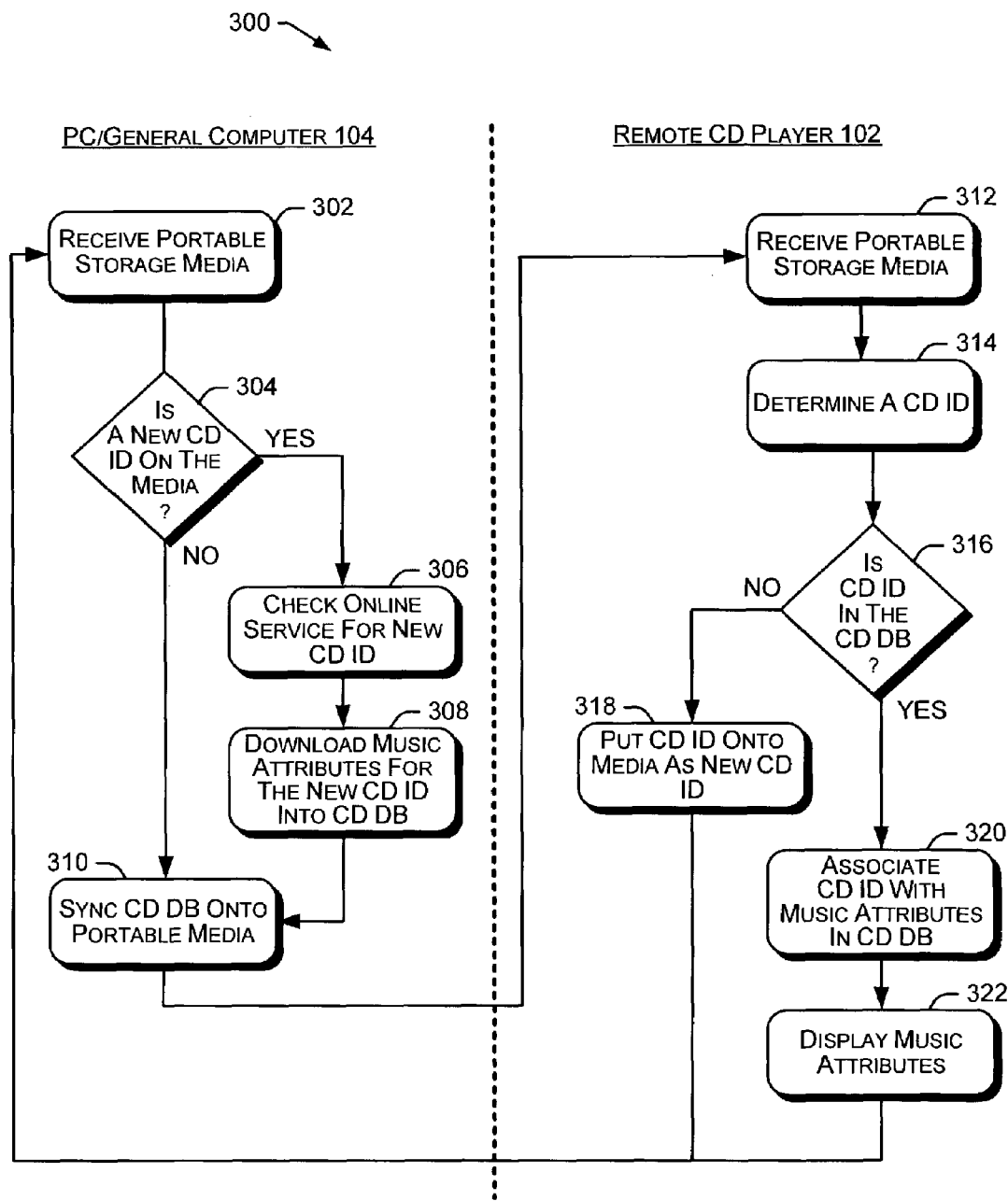
FIG. 3 is a flow diagram illustrating an exemplary method of implementing one or more embodiments of a dynamic mobile CD music attributes database.

FIG. 3 shows an exemplary method 300 for implementing an embodiment of a dynamic mobile CD music attributes database 220. At block 300, a PC 104, receives portable storage media 106. Portable storage media 106 can include a CD 210 and/or a memory card 212 such as an SD card, a CF card, a SmartMedia card, a Memory Stick, a MMC card, a PCMCIA flash card, and the like. At block 304, the PC determines if there is a new CD identification on the storage media 106. CD identifications are typically, but not necessarily, located in a CD music attributes database 220 stored on portable storage media 106. The PC compares CD identifications on the storage media 106 with CD identifications in a CD attributes database 220(A) on the PC. Any CD identifications present on the storage media 106 that are not present in the database 220(A) on the PC are considered to be new CD identifications representing new CDs. As noted above, a comparison and identification of CD identifications between CD attributes database 220(A) on the PC 104 and a corresponding CD attributes database 220(B) on a portable CD player 102 can also be achieved through a wireless connection 112.

Continuing at block 306, if a new CD identification is found on the storage media 106, the PC checks an online service to try and locate the CD identification. The online service is generally an online music database service that can provide music information to PC 104 for a wide variety of CD music. The information available on the online service can include CD music attributes such as CD titles, album art, composers, artists, biographies, discographies, musical genre, recording dates, reviews, related news, related artists, track titles, and the like. Examples of such services include Gracenote.com and WindowsMedia.com. At block 308, CD music attributes associated with the new CD identification are downloaded to the PC from the online music service. The PC stores the CD music attributes in a CD music attributes database 220.

At block 310, whether or not new CD identifications were found on the portable storage media, the CD music attributes database 220(A) is synchronized onto the portable storage media. Therefore, if the CD music attributes database 220(A) on the PC has been updated with additional CD music attributes, then any prior version of the CD music attributes database 220 on the portable storage media is overwritten with an updated version of the CD music attributes database 220(A). Again, as discussed above, the synchronization between the CD attributes database 220(A) on the PC 104 and a corresponding CD attributes database 220(B) on a portable CD player 102 can also be achieved through a wireless connection 112.

The method 300 continues on a remote CD player 102 at block 312. At block 312, remote CD player 102 receives portable storage media 106. Receiving portable storage media 106 typically includes receiving a CD 210 and/or receiving a memory card 212. Portable storage media 106 generally includes a CD music attributes database 220 that can either be loaded onto a memory onboard the remote player 102 for future access, or it can remain on the portable storage media 106 for access by remote player 102. Remote CD player 102 determines a CD identification at block 314. The CD identification belongs to a CD 210 that has been inserted into a CD drive on remote player 102. As discussed above, determining a CD identification involves calculating a TOC (table of contents) of start and stop times for tracks on a CD.

At block 316, the remote player 102 determines if the CD identification is present in the CD music attributes database 220(B). At block 318, if the CD identification is not present in the CD music attributes database 220(B), the remote player 102 stores the CD identification on the portable storage media 106 as a new CD identification. At block 320, the remote player 102 has determined that the CD identification is present on the portable storage media 106 and therefore retrieves CD music attributes associated with the CD identification. At block 322, remote player displays the CD music attributes. The method 300 continues in a cyclical manner at block 302, where the PC again receives portable storage media 106 that may have new CD identifications stored on it. In this manner, a CD music attributes database 220 is dynamically updated as it travels between a PC and a remote CD player, making music attributes available for display on remote CD players.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 4:
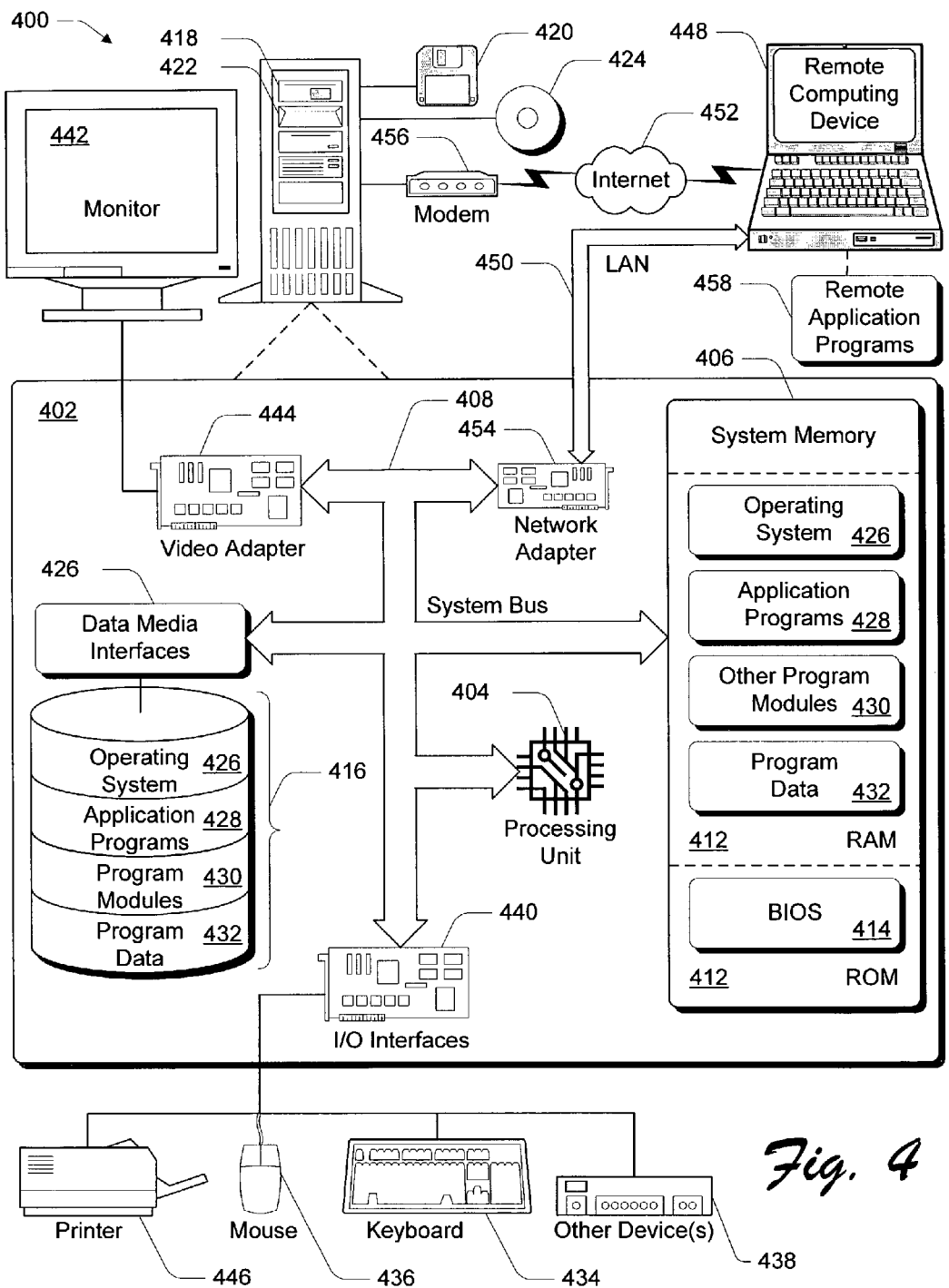
FIG. 4 illustrates an exemplary computing environment that is suitable for implementing a general-purpose computer.

FIG. 4 illustrates an example of a suitable computing environment 400 that may be used to implement the general-purpose computer 104. Although one specific configuration is shown, computer 104 may be implemented in other computing configurations.

The computing environment 400 includes a general-purpose computing system in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media. The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 can also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by a SCSI interface (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may include an embodiment of a caching scheme for user network access information.

Computer 402 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer system 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computer system 402, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A handheld CD (compact disc) player comprising:
    a CD drive to receive a CD and to determine a CD identification from the CD;
    a media slot to receive a portable memory card having a database; and
    an attributes access module configured to retrieve music attributes from the database associated with the CD identification and to store the CD identification in the database if the CD identification is not already in the database.

2. A handheld CD player as recited in claim 1, further comprising a media player to play the CD and display the music attributes.

3. A handheld CD player as recited in claim 1, wherein the portable memory card is selected from the group comprising:
    an SD (secure digital) card;
    a CF (compact flash) card;
    a SmartMedia card;
    a Memory Stick;
    a MMC (multimedia card); and
    a portable hard disc drive.

4. A handheld CD (compact disc) player comprising:
    a memory;
    a CD drive configured to receive a CD and determine a CD identification;
    a media slot configured to receive a portable storage card; and
    an attributes access module configured to update a database in the memory with the CD identification and to transfer the database onto the portable storage card.

5. A handheld CD player as recited in claim 4, further comprising music attributes stored in the database, the attributes access module further configured to retrieve and display music attributes associated with the CD identification.

6. A handheld CD (compact disc) player comprising:
    means for determining a CD identification from a CD (compact disc);
    means for searching for the CD identification in a database; and
    means for storing the CD identification on a portable storage medium if the CD identification is not found in the database.

7. A handheld CD player as recited in claim 6, further comprising:
    means for retrieving music attributes from the database that are associated with the CD identification if the CD identification is found in the database; and
    means for displaying the music attributes.

8. A handheld CD player as recited in claim 6, wherein the database is located on the portable storage medium.

9. A handheld CD player as recited in claim 6, is wherein the means for searching further comprises:
    means for accessing the portable storage medium;
    means for transferring the database from the portable storage medium to a memory on the handheld CD player; and
    means for searching for the CD identification in the database on the handheld CD player.

10. A handheld CD player as recited in claim 6, wherein the means for determining further comprises means for calculating a TOC (table of contents) for the CD, the TOC comprising start and stop times for a plurality of tracks on the CD.

* * * * *

UNITED STATES PATENT AND TRADEMARK OFFICE
CERTIFICATE OF CORRECTION

PATENT NO.       : 7,412,459 B1
APPLICATION NO.  : 10/400044
DATED            : August 12, 2008
INVENTOR(S)      : Bruce Alan Johnson et al.

It is certified that error appears in the above-identified patent and that said Letters Patent is hereby corrected as shown below:

In column 12, line 45, in Claim 9, after "claim 6," delete "is".

Signed and Sealed this
Third Day of May, 2011

David J. Kappos
*Director of the United States Patent and Trademark Office*